United States Patent
Kaneko Kunitake et al.

(10) Patent No.: US 12,511,336 B2
(45) Date of Patent: Dec. 30, 2025

(54) FOOD INFORMATION PRESENTATION SYSTEM, FOOD INFORMATION PRESENTATION METHOD, FOOD INFORMATION PRESENTATION DEVICE, FOOD INFORMATION PRESENTATION PROGRAM, AND STORAGE MEDIUM ON WHICH PROGRAM IS RECORDED

(71) Applicants: KIKKOMAN CORPORATION, Noda (JP); NABLAS Inc., Tokyo (JP)

(72) Inventors: Yuri Kaneko Kunitake, Noda (JP); Yasukazu Maeda, Noda (JP); Junya Takeichi, Noda (JP); Kotaro Nakayama, Tokyo (JP)

(73) Assignees: Kikkoman Corporation, Chiba (JP); Nablas Inc., Tokyo (JP)

( * ) Notice: Subject to any disclaimer, the term of this patent is extended or adjusted under 35 U.S.C. 154(b) by 0 days.

(21) Appl. No.: 18/844,605

(22) PCT Filed: Mar. 29, 2022

(86) PCT No.: PCT/JP2022/015258
§ 371 (c)(1),
(2) Date: Sep. 6, 2024

(87) PCT Pub. No.: WO2023/187952
PCT Pub. Date: Oct. 5, 2023

(65) Prior Publication Data
US 2025/0181658 A1    Jun. 5, 2025

(51) Int. Cl.
*G06F 16/9535* (2019.01)
(52) U.S. Cl.
CPC ............................. *G06F 16/9535* (2019.01)
(58) Field of Classification Search
CPC .................................................. G06F 16/9535
See application file for complete search history.

(56) References Cited

U.S. PATENT DOCUMENTS

| 9,212,996 B2 * | 12/2015 | Watson | G01N 21/31 |
| 2014/0347265 A1 * | 11/2014 | Aimone | G06F 3/015 345/156 |

(Continued)

FOREIGN PATENT DOCUMENTS

| CA | 3189350 A1 | 1/2022 |
| JP | 2011-034455 A | 2/2011 |

(Continued)

OTHER PUBLICATIONS

PCT/ISA/210 from International Application PCT/JP2022/015258 with the English translation thereof.

(Continued)

*Primary Examiner* — Mark E Hershley
(74) *Attorney, Agent, or Firm* — Carrier, Shende & Associates P.C.; Joseph P. Carrier; Jeffrey T. Gedeon

(57) ABSTRACT

A presentation system S includes: a user information recognition unit configured to recognize user information; a current emotion recognition unit configured to recognize a current emotion of a user; a recommended food recognition unit configured to recognize a recommended food item by using a prediction model which receives an input of the user information and the current emotion and outputs the recommended food item; and a food information presentation unit configured to obtain and present the user with food information about the recommended food item. The current emotion recognition unit is configured to estimate, as the current emotion, coordinates selected by the user from an emotion model in which coordinates are defined based on a plurality of basic emotions.

9 Claims, 10 Drawing Sheets

(56) References Cited

U.S. PATENT DOCUMENTS

| | | | | |
|---|---|---|---|---|
| 2015/0332118 | A1* | 11/2015 | Wang | G06V 20/40 382/203 |
| 2016/0170996 | A1* | 6/2016 | Frank | G06F 16/904 707/748 |
| 2016/0171514 | A1* | 6/2016 | Frank | G06Q 30/02 705/7.29 |
| 2016/0203138 | A1* | 7/2016 | Feldschuh | G06F 16/9535 707/722 |
| 2017/0024656 | A1* | 1/2017 | Gilon | G16H 10/20 |
| 2018/0025368 | A1 | 1/2018 | Frank et al. | |
| 2018/0032305 | A1* | 2/2018 | Cameron | G06F 40/30 |
| 2018/0190375 | A1* | 7/2018 | Chapela | G06F 16/9024 |
| 2018/0218198 | A1* | 8/2018 | Hushchyn | G06V 40/166 |
| 2018/0240359 | A1* | 8/2018 | Hujsak | G06N 5/022 |
| 2019/0073601 | A1* | 3/2019 | Alkan | G06N 20/00 |
| 2019/0095454 | A1* | 3/2019 | Sahadi | G06F 16/9537 |
| 2020/0074156 | A1* | 3/2020 | Janumpally | G06V 40/173 |
| 2020/0184278 | A1* | 6/2020 | Zadeh | G06N 3/044 |
| 2020/0364588 | A1* | 11/2020 | Knox | H04L 67/565 |
| 2021/0004891 | A1* | 1/2021 | Abutair | G06N 5/04 |
| 2021/0049348 | A1* | 2/2021 | Qureshi | G06V 40/165 |
| 2021/0191971 | A1* | 6/2021 | Ko | G06N 99/00 |
| 2021/0248656 | A1* | 8/2021 | Makowsky | G06Q 30/0621 |
| 2022/0028527 | A1* | 1/2022 | Inwald | G16H 20/17 |
| 2022/0062621 | A1* | 3/2022 | Hogg | A61N 1/36014 |
| 2022/0208339 | A1* | 6/2022 | Neumann | G16H 50/20 |
| 2022/0270594 | A1* | 8/2022 | Sejpal | G06N 3/045 |
| 2023/0120262 | A1* | 4/2023 | Matic | A61B 5/681 600/301 |

FOREIGN PATENT DOCUMENTS

| | | |
|---|---|---|
| JP | 2020-052638 A | 4/2020 |
| WO | 2020/241693 A1 | 12/2020 |

OTHER PUBLICATIONS

Nakamura et al., "Acceptability evaluation in prototype of menu search system by feelings", IEICE technical report vol. 112 No. 75, pp. 73-77 entire text.

Nakajima et al., "Recipe Recommender System", May 1, 2019, vol. 34 No. 3 (serial No. 195). pp. 317-323.

PCT/ISA/237 from International Application PCT/JP2022/015258.

Extended European Search Report dated Oct. 20, 2025 issued in the corresponding EP Patent Application No. 22935105.1.

* cited by examiner

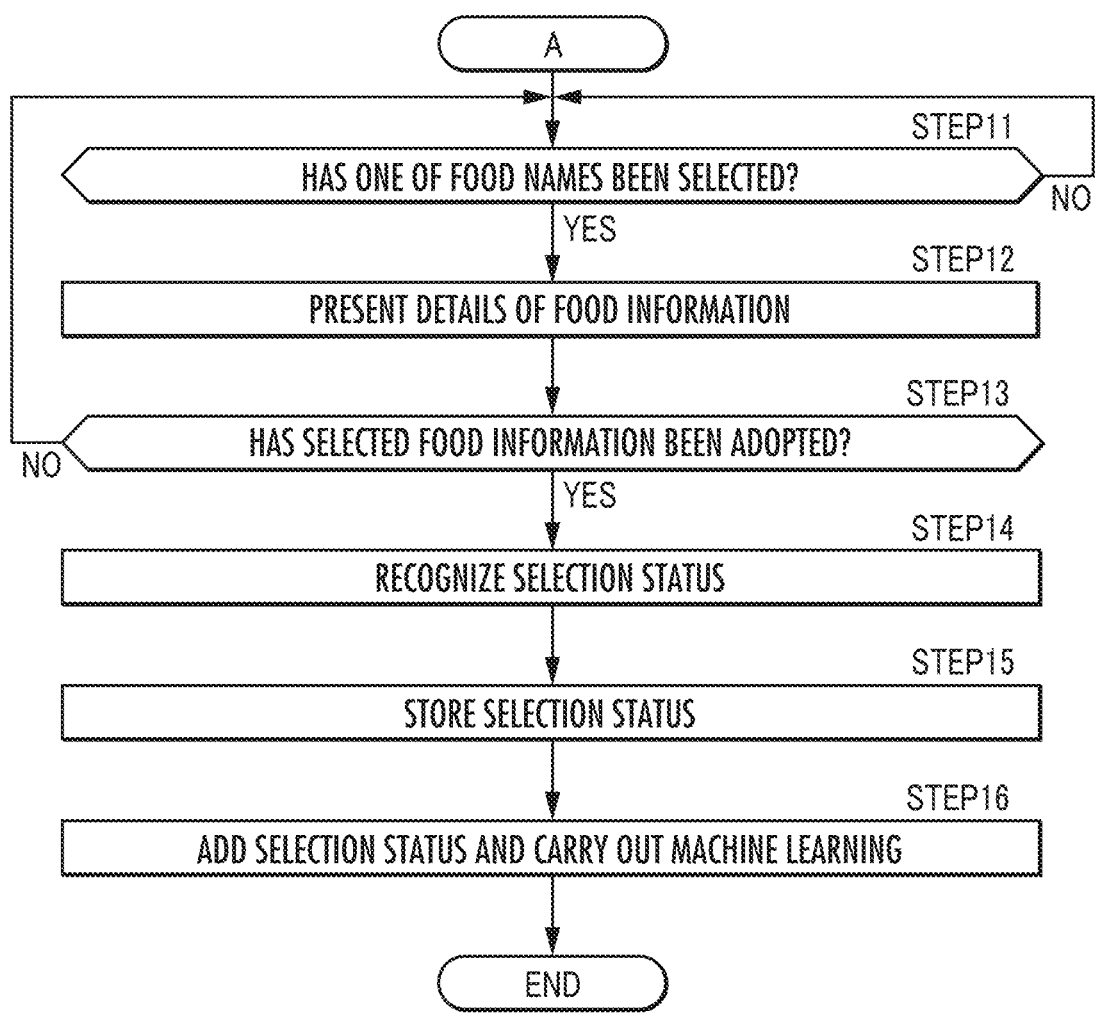

FOOD INFORMATION PRESENTATION SYSTEM, FOOD INFORMATION PRESENTATION METHOD, FOOD INFORMATION PRESENTATION DEVICE, FOOD INFORMATION PRESENTATION PROGRAM, AND STORAGE MEDIUM ON WHICH PROGRAM IS RECORDED

TECHNICAL FIELD

The present invention is related to a food information presentation system, a food information presentation method, a food information presentation device, a food information presentation program, and a storage medium on which the program is recorded, that are configured to present a user with information about food on which carrying out eating behavior is recommended.

BACKGROUND ART

Conventionally, a known system is configured to exhibit, for a user, food on which carrying out eating behavior is recommended. In this situation, the "eating behavior" denotes various types of actions related to food intake and includes, not only the action itself of eating food, but also cooking the food, preparation therefor, and making a reservation at a business that offers the food.

In relation to the above, the recommended food may vary depending on, not only conditions based on the user himself/herself such as the user's preferences about food, but also environmental conditions (e.g., how much time can be spent on the eating behavior, ingredients that are available, etc.). Thus, as an example of this type of system, a known system (see, for example, Patent Literature 1) is configured to exhibit recommended food, by taking into account environmental conditions, in addition to the user's preferences about food.

CITATION LIST

Patent Literature

Patent Literature 1: International Publication No. WO 2020/241693

SUMMARY OF INVENTION

Technical Problem

When recognizing the recommended food, the system disclosed in Patent Literature 1 refers only to certain parameters that are fixed to an extent such as preferences and circumstances, and does not refer to parameters that can easily vary such as the user's feelings (i.e., emotions).

However, it is known that there is a certain correlational relationship between emotions and eating behavior (see, for example, IMADA, Sumio (2009), Kanjou to Shokukoudou (Emotion and eating: Macht's five-way model), The Japanese Journal of Research on Emotions, vol. 17, pp. 120-128). Accordingly, unless emotions are accurately taken into account, it would be difficult to accurately understand food items which, when eating behavior is carried out thereon, have a high possibility of giving satisfaction.

Further, generally speaking, it is difficult for a user to accurately express his/her emotions (and to also input his/her emotions to a system). In addition, studying his/her own emotions in search for an accurately expression may make the user feel cumbersome, and as a result, there is also a possibility that a further change in his/her emotions may be caused.

In view of the circumstances described above, it is an object of the present invention to provide a food information presentation system, a food information presentation method, a food information presentation device, a food information presentation program, and a storage medium on which the program is recorded, that are capable of presenting a user information about food items which, when eating behavior is carried out thereon, have a high possibility of giving satisfaction, while emotions are accurately taken into account.

Solution to Problem

A food information presentation system of the present invention is a food information presentation system which presents a user with food information being information about a recommended food item on which the user is recommended to carry out eating behavior, comprising:
- a user information recognition unit configured to recognize user information being information including at least one of biological information, a preference, and an environment of the eating behavior of the user;
- a current emotion recognition unit configured to recognize a current emotion being an emotion experienced at a point in time when the user wishes to obtain the food information;
- a recommended food recognition unit configured to recognize the recommended food item by using a prediction model which receives an input of the user information and the current emotion and outputs the recommended food item; and
- a food information presentation unit configured to obtain the food information from a food information recognition unit which has recognized a plurality of pieces of information about candidate food items being food items that are used by the prediction model and that may each serve as the recommended food item and further configured to present the user with the obtained food information.

The current emotion recognition unit includes:
- an emotion model exhibition unit configured to exhibit, for the user, an emotion model being either a planar model or a three-dimensional model in which coordinates are defined based on a plurality of basic emotions, while using a format in which a set of coordinates is selectable from the emotion model; and
- a coordinate recognition unit configured to recognize selected coordinates that are coordinates selected by the user from the emotion model as the current emotion.

As the prediction model, the recommended food recognition unit is configured to use a prediction model that has learned, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

In this situation, the "user" denotes a person who uses the food information presentation system of the present invention. Thus, possible examples of the user include, in addition to the person himself/herself who carries out the eating behavior, a person who prompts another person to carry out the eating behavior, and a person who is prompted by another person to carry out the eating behavior. For instance, examples include a parent who uses the system for his/her child and a child whose eating behavior is managed by his/her parent.

Further, the "food information" in the present example includes, in addition to information about the food items themselves such as the names, ingredients, and recipes of the food items, information about businesses that offer the food items, and information about how to acquire the food items such as the names of the services capable of delivering the food items.

Further, the "training data" is data used for training a machine learning algorithm and examples thereof include feature values and correct answer data used in the training, and sets made up of the feature values and the correct answer data. Further, more specifically, the "training data" is data used for determining parameters included in the machine learning algorithm and examples thereof include feature values and correct answer data used for determining the parameters, and sets made up of the feature values and the correct answer data.

As described above, in the food information presentation system of the present invention, as an interface for inputting the emotion of the user, the emotion model that is either a planar model or a three-dimensional model in which the coordinates are defined based on the plurality of basic emotions is adopted, so that the coordinates selected from the emotion model are recognized as the emotion of the user. Consequently, without a conversion into a linguistic expression or the like, the user is able to easily and accurately express his/her own emotion with a value represented by the coordinates.

Further, in the present system, the coordinates are used as the input data. In other words, in the present system, instead of an ambiguous parameter called an emotion, the definitive parameter realized with the coordinates is adopted. Consequently, because ambiguity is eliminated from the input data in the present system, it is possible to obtain the accurate recommended food items as the output data.

Consequently, the system of the present invention is able to present the user with the food information about the suitable recommended food items, while the emotion is also accurately taken into account. Also, by carrying out eating behavior on the recommended food items, the user is able to achieve satisfaction with a high probability.

Further, in the food information presentation system of the present invention,
it is desirable that the emotion model is a model including a first coordinate axis representing one or more basic emotions and a second coordinate axis representing magnitudes of the basic emotions.

When the model using such coordinate axes is adopted as the emotion model, the user is able to easily and intuitively understand which emotion is indicated by certain coordinates in the emotion model. As a result, the user is able to easily and accurately express his/her emotion as the coordinates, and ambiguity is further eliminated from the input data. Consequently, it is possible to present the user with the food information about even more suitable recommended food items, while the emotion is taken into account further accurately.

As the emotion model using such coordinate axes, for example, it is acceptable to adopt the EmojiGrid (Registered Trademark), Plutchik's wheel of emotions, or a model created based on either of these (e.g., a circular model conveniently using color arrangements in Plutchik's wheel of emotions). Further, as the basic emotions, it is acceptable to adopt, for example, joy, trust, fear, surprise, sadness, disgust, anger, and anticipation used in Plutchik's wheel of emotions or joy, fear, surprise, sadness, disgust, and anger used in Ekman's theory.

Further, in the food information presentation system of the present invention,
it is desirable that the recommended food recognition unit is configured to recognize a plurality of recommended food items including the recommended food item, and that the food information presentation unit is configured to present the user with the food information corresponding to each of the plurality of recommended food items.

When the food information about the plurality of recommended food items is presented in this manner, a final selection as to on which recommended food item the eating behavior is to be carried out is entrusted to the user. As a result, when the eating behavior is actually carried out on the selected recommended food item, the user is able to feel a sense of being convinced that the food item on which the eating behavior is carried out has been selected by himself/herself. Thus, the user is able to easily achieve satisfaction from a result of the eating behavior.

Further, in the food information presentation system of the present invention that is configured to present a plurality of pieces of food information,
it is desirable that the system comprises a selection status recognition unit configured to recognize, with respect to each of the plurality of recommended food items, a selection status being a status at a point in time when the recommended food item became a selected food item selected by the user from among the plurality of recommended food items, and
that, as the prediction model, the recommended food recognition unit is configured to use a prediction model that has learned, through machine learning, a correlation between the candidate food items, and the selected coordinates, the user information, and the selection status while using each of the plurality of candidate food items, and the selected coordinates, the user information, and the selection status as training data, the prediction model being configured to output the recommended food item selected from among the plurality of candidate food items.

In this manner, regarding the selected food items obtained at the immediately preceding occasion or earlier, the prediction model configured to adopt, as the training data, the selection status indicating the status corresponding to the point in time when the recommended food item became the selected food item reflects an actual state of the user. As a result, by carrying out the eating behavior on the recommended food item output by the predication model, the user is able to achieve satisfaction with an even higher probability.

In this situation, examples of the "selection status", as for the status on the system side, include: the number of times of selection (described later); a display position; as well as a recommended food item which served as a selected food item before the current selected food item was selected; and the type of the recommended food item which was simultaneously exhibited at the point in time when the selected food item was selected. Examples of the selection status, as for a status on the user side, include: the time at which the food item was selected (which therefore indicates whether the food item is for breakfast or for dinner), and an action taken by the user (e.g., operations performed on a mobile terminal) before and after the point in time when the selected food item was selected.

Further, in the food information presentation system of the present invention that is configured to use the prediction model which adopts, as the training data, the selection status being a status at a point in time when the recommended food item became a selected food item, it is desirable that, as the selection status, the selection status recognition unit is configured to recognize a number of times of selection indicating how many times each of the plurality of recommended food items became at least the selected food item.

Becoming a selected food item means having a high possibility of being directly liked by the user. Thus, by adopting the number of times of selection as the selection status in this manner, the output recommended food item easily conforms to preferences of the user. Accordingly, it is possible to present the user with the food information about the suitable recommended food items.

Further, in the food information presentation system of the present invention that is configured to use the prediction model which adopts, as the training data, the selection status being a status at a point in time when the recommended food item became a selected food item, it is desirable that, as the prediction model, the recommended food recognition unit is configured to use a prediction model that has learned, through machine learning, a correlation between the candidate food items, and the selected coordinates, the user information, and the selection status, as well as a recommendation degree indicating a magnitude of the correlation, while using each of the plurality of candidate food items, and the selected coordinates, the user information, and the selection status as training data, the prediction model being configured to output the recommended food item selected from among the plurality of candidate food items and the recommendation degree of the recommended food item, and that the food information presentation unit is configured to present the user with the food information corresponding to each of the plurality of recommended food items, either together with the recommendation degrees or by using a format where the higher the recommendation degree of the recommended food item is, the higher priority is given to the food information corresponding to the recommended food item.

In this manner, when the food information corresponding to each of the plurality of recommended food items is presented to the user, either together with the recommendation degrees or by using the format where the higher the recommendation degree of the recommended food item is, the higher priority is given thereto, the user is able to easily select the food information about a recommended food item that has a high recommendation degree and has a high possibility of giving him/her satisfaction.

Furthermore, another food information presentation system of the present invention is a food information presentation system which presents a user with food information being information about a recommended food item on which the user is recommended to carry out eating behavior, comprising:

a user information recognition unit configured to recognize user information being information including at least one of biological information, a preference, and an environment of the eating behavior of the user;

a current emotion recognition unit configured to recognize a current emotion being an emotion experienced at a point in time when the user wishes to obtain the food information;

a recommended food recognition unit configured to recognize the recommended food item based on correlation data indicating a correlation between the user information and the current emotion, and each of a plurality of candidate food items that may each serve as the recommended food item; and a food information presentation unit configured to obtain the food information from a food information recognition unit which has recognized a plurality of pieces of information about the candidate food items and further configured to present the user with the obtained food information.

The current emotion recognition unit includes:

an emotion model exhibition unit configured to exhibit, for the user, an emotion model being either a planar model or a three-dimensional model in which coordinates are defined based on a plurality of basic emotions, while using a format in which a set of coordinates is selectable from the emotion model; and a coordinate recognition unit configured to recognize selected coordinates that are coordinates selected by the user from the emotion model as the current emotion.

As described above, in the food information presentation system of the present invention, as an interface for inputting the emotion of the user, the emotion model that is either a planar model or a three-dimensional model in which the coordinates are defined based on the plurality of basic emotions is adopted, so that the coordinates selected from the emotion model are recognized as the emotion of the user. Consequently, without a conversion into a linguistic expression or the like, the user is able to easily and accurately express his/her own emotion with a value represented by the coordinates.

Further, in the present system, the coordinates are adopted as the current emotion. In other words, in the present system, instead of an ambiguous parameter called an emotion, the definitive parameter realized with the coordinates is adopted. Consequently, in the present system, because ambiguity is eliminated from the item called the current emotion corresponding to one of the two elements of the correlation data, it is possible to accurately obtain the recommended food items corresponding to the other element of the correlation data.

Consequently, the system of the present invention is able to present the user with the food information about the suitable recommended food items, while the emotion is also accurately taken into account. Also, by carrying out eating behavior on the recommended food items, the user is able to achieve satisfaction with a high probability.

In addition, a food information presentation method of the present invention is a food information presentation method for presenting a user with food information being information about a recommended food item on which the user is recommended to carry out eating behavior, comprising:

a step in which a user information recognition unit recognizes user information being information including at least one of biological information, a preference, and an environment of the eating behavior of the user;

a step in which a current emotion recognition unit recognizes a current emotion being an emotion experienced at a point in time when the user wishes to obtain the food information;

a step in which a recommended food recognition unit recognizes the recommended food item by using a prediction model which receives an input of the user information and the current emotion and outputs the recommended food item; and a step in which a food information presentation unit obtains the food information from a food information recognition unit which has recognized a plurality of pieces of information about candidate food items being food items that are used by the prediction model and that may each serve as the recommended food item and further presents the user with the obtained food information.

The step of recognizing the current emotion includes:

a process performed by an emotion model exhibition unit of the current emotion recognition unit to exhibit, for the user, an emotion model being either a planar model or a three-dimensional model in which coordinates are defined based on a plurality of basic emotions, while using a format in which a set of coordinates is selectable from the emotion model; and a process performed by a coordinate recognition unit of the current emotion recognition unit to recognize selected coordinates that are coordinates selected by the user from the emotion model as the current emotion.

In the step of recognizing the recommended food item, as the prediction model, the recommended food recognition unit is configured to use a prediction model that has learned, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

Further, a food information presentation device of the present invention is a food information presentation device which presents a user with food information being information about a recommended food item on which the user is recommended to carry out eating behavior, comprising:

a user information recognition unit configured to recognize user information being information including at least one of biological information, a preference, and an environment of the eating behavior of the user;

a current emotion recognition unit configured to recognize a current emotion being an emotion experienced at a point in time when the user wishes to obtain the food information;

a recommended food recognition unit configured to recognize the recommended food item by using a prediction model which receives an input of the user information and the current emotion and outputs the recommended food item; and a food information presentation unit configured to obtain the food information from a food information recognition unit which has recognized a plurality of pieces of information about candidate food items being food items that are used by the prediction model and that may each serve as the recommended food item and further configured to present the user with the obtained food information.

The current emotion recognition unit includes:

an emotion model exhibition unit configured to exhibit, for the user, an emotion model being either a planar model or a three-dimensional model in which coordinates are defined based on a plurality of basic emotions, while using a format in which a set of coordinates is selectable from the emotion model; and a coordinate recognition unit configured to recognize selected coordinates that are coordinates selected by the user from the emotion model as the current emotion.

As the prediction model, the recommended food recognition unit is configured to use a prediction model that has learned, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

Furthermore, a food information presentation program of the present invention is a food information presentation program that causes a computer to execute a food information presentation method for presenting a user with food information being information about a recommended food item on which the user is recommended to carry out eating behavior.

The computer is caused to execute:

a step in which a user information recognition unit recognizes user information being information including at least one of biological information, a preference, and an environment of the eating behavior of the user;

a step in which a current emotion recognition unit recognizes a current emotion being an emotion experienced at a point in time when the user wishes to obtain the food information;

a step in which a recommended food recognition unit recognizes the recommended food item by using a prediction model which receives an input of the user information and the current emotion and outputs the recommended food item; and a step in which a food information presentation unit obtains the food information from a food information recognition unit which has recognized a plurality of pieces of information about candidate food items being food items that are used by the prediction model and that may each serve as the recommended food item and further presents the user with the obtained food information.

The step of recognizing the current emotion includes:

a process performed by an emotion model exhibition unit of the current emotion recognition unit to exhibit, for the user, an emotion model being either a planar model or a three-dimensional model in which coordinates are defined based on a plurality of basic emotions, while using a format in which a set of coordinates is selectable from the emotion model; and a process performed by a coordinate recognition unit of the current emotion recognition unit to recognize selected coordinates that are coordinates selected by the user from the emotion model as the current emotion.

In the step of recognizing the recommended food item, as the prediction model, the recommended food recognition unit is configured to use a prediction model that has learned, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

Further, a storage medium of the present invention has recorded thereon the food information presentation program

BRIEF DESCRIPTION OF DRAWINGS

FIG. 4B is a flowchart showing a process performed by the presentation system in FIG. 1 when food information has been selected.

DESCRIPTION OF EMBODIMENTS

The following will describe a food information presentation system (hereinafter, a "presentation system S") according to an embodiment and a food information presentation method implemented by using the system, with reference to the drawings.

The presentation system S according to the present embodiment is used in a service configured, in response to a request from a user U, to extract, from among a plurality of candidate food items, recommended food being food on which the user U is recommended to carry out eating behavior and configured to further present the user U with food information about the recommended food.

In the following description, the "user" denotes a person who uses the presentation system S. Thus, possible examples of the user U include, in addition to the person himself/herself who carries out the eating behavior, a person who prompts another person to carry out the eating behavior, and a person who is prompted by another person to carry out the eating behavior. For instance, examples include a parent who uses the system for his/her child and a child whose eating behavior is managed by his/her parent.

In this situation, possible examples of the "food information" include, in addition to information about the food items themselves such as the names, ingredients, and recipes of the food items, information about businesses that offer the food items, and information about how to acquire the food items such as the names of the services capable of delivering the food items.

A Schematic Configuration of the System

Next, a schematic configuration of the presentation system S will be described below, with reference to FIG. 1 and FIG. 2.

Figure 1:
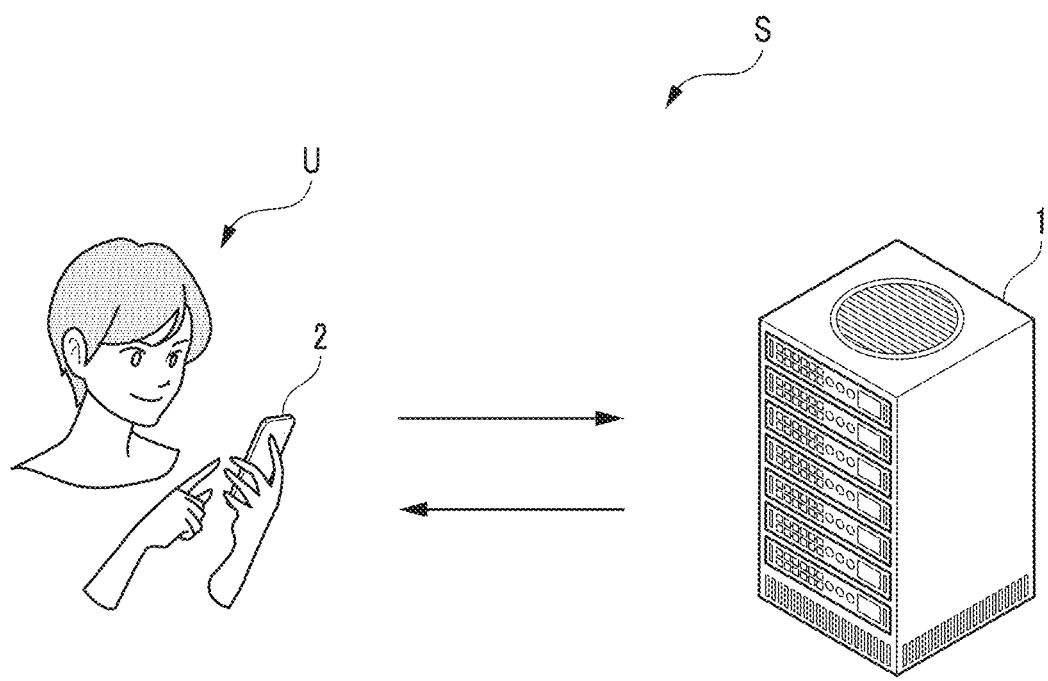
FIG. 1 is a drawing for explaining a schematic configuration of a presentation system according to an embodiment.

As shown in FIG. 1, the presentation system S is a computer system for presenting the user U the food information and is structured with a server 1 owned by a person who offers the service realized by the presentation system S.

Via an Internet network, a public communication line, or the like, the server 1 is configured to be able to perform mutual information communication with a user terminal 2 such as a smartphone or a tablet owned by the user U.

In this situation, the food information presentation system of the present invention is not limited to being structured with the single server. It is sufficient as long as one of terminals structuring the food information presentation system comprises processing units described later.

Accordingly, for example, the entirety of the food information presentation system may be structured with a plurality of servers. Alternatively, it is also acceptable to install, in a user terminal, at least one of processing units or at least a part of functions of the processing units, so that the system is structured by a collaboration between the user terminal and the server or by the user terminal alone. Further, in the present embodiment, it is also acceptable to provide a terminal having a processing unit with functions corresponding to an input unit 20 and an output unit 21 provided for the user terminal 2, so as to structure an independent food information presentation device.

Figure 2:
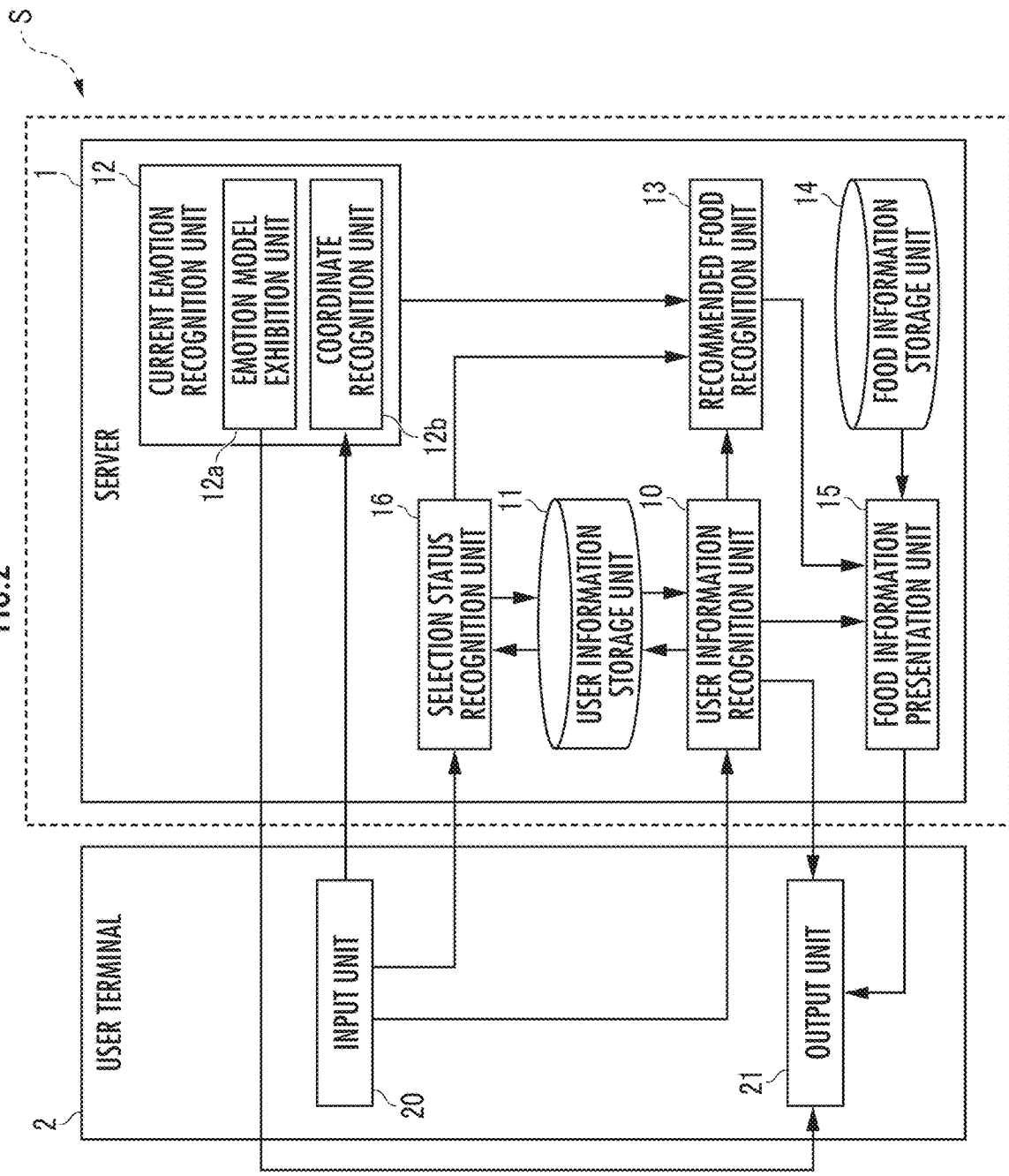
FIG. 2 is a block diagram showing a configuration of processing units of the presentation system shown in FIG. 1.

Further, as shown in FIG. 2, the user terminal 2 capable of communicating with the server 1 working as the presentation system S comprises the input unit 20 and the output unit 21 as functions (the processing units) realized by at least one of an installed hardware configuration and a program.

In the present embodiment, an example will be described in which the input unit 20 and the output unit 21 of the user terminal 2 are realized with a touch panel. It should be noted, however, that the user terminal is not limited to this configuration. It is sufficient as long as the user terminal is capable of receiving information inputs from the user and yielding outputs for exhibiting information for the user. Consequently, for example, the user terminal may be configured to be able to input and to output the information by using, other than the touch panel, a keyboard, a microphone, a camera, a speaker, and/or the like.

Configurations of the Processing Units

As shown in FIG. 2, as functions (the processing units) realized by at least one of the installed hardware configuration and the program, the server 1 comprises a user information recognition unit 10, a user information storage unit 11, a current emotion recognition unit 12, a recommended food recognition unit 13, a food information storage unit 14 (a food information recognition unit), a food information presentation unit 15, and a selection status recognition unit 16.

The user information recognition unit 10 is configured to recognize, as user information, information including at least one of biological information, a preference, and an environment of the eating behavior of the user U.

In this situation, the "biological information" denotes information about the body of the user which may impact the eating behavior. Examples of the physical information include the gender, the age, the height, and the weight of the user. Further, examples of the "preference" include not only a preference of the user about food or ingredients themselves, but also a preference of the user which may impact the eating behavior. For instance, examples include whether the user likes or dislikes the summer (which may also include an appetite state related to temperatures).

Further, in relation to the above, examples of the "environment of the eating behavior" include the number of people involved when the user carries out the eating behavior; a relationship between a person who carries out the eating behavior together and the user; a time when carrying out the eating behavior is scheduled; a place where the eating behavior is carried out, the type of the eating behavior (e.g., whether the user eats or the user prompts someone else to eat; and whether the user cooks his/her own meals or eats out).

Figure 5:
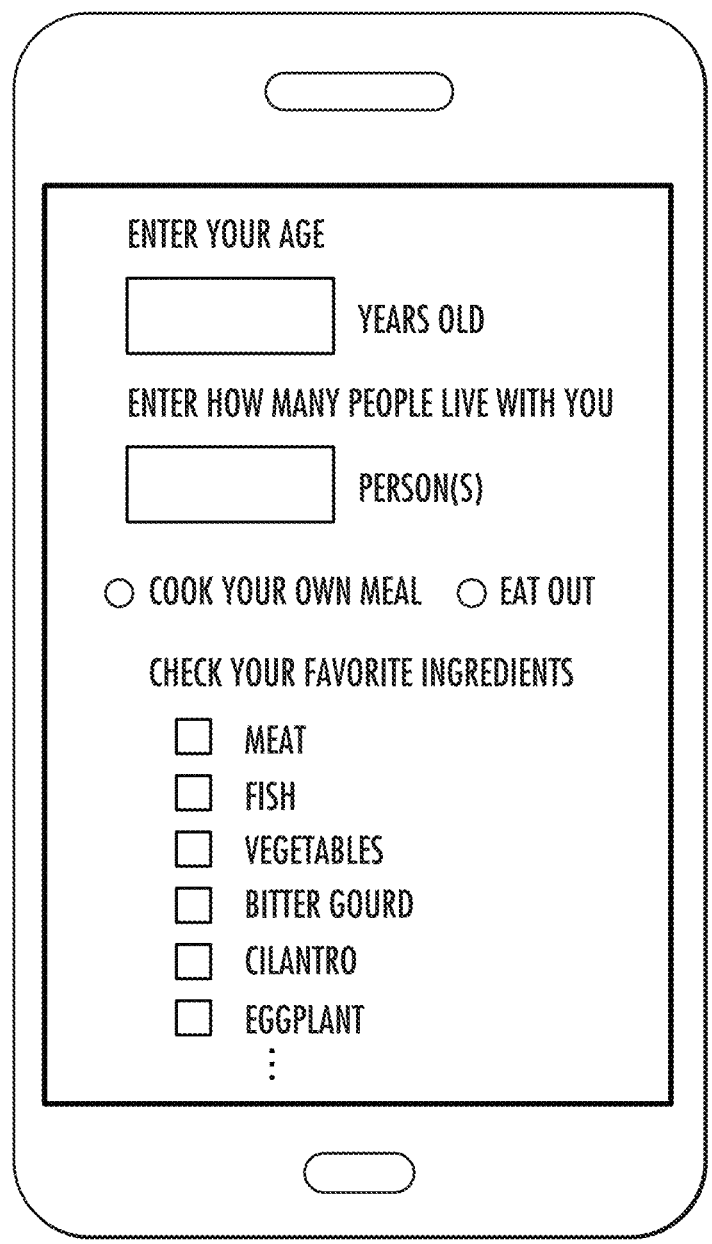
FIG. 5 is a conceptual drawing showing an example of an image displayed on a user terminal when the presentation system in FIG. 1 is to recognize user information.

In the presentation system S, to begin with, the user information recognition unit 10 exhibits a prescribed questionnaire on the output unit 21 of the user terminal 2 (see FIG. 5). After that, the user information recognition unit 10 refers to answers to the questionnaire and information stored in the user information storage unit 11 and recognizes the user information related to the user U who is to receive, at this time, the service offered by the presentation system S.

Further, when the recognized user information is different from the user information stored in the user information storage unit 11, the user information recognition unit 10 is configured to store the new user information into the user information storage unit 11.

The user information storage unit 11 is configured to store therein, with respect to each user U, the user information corresponding to the user U. To begin with, the user information storage unit 11 has stored therein, as initial information, the user information obtained at the time of a registration procedure performed so that the user U is able to receive the service offered by the presentation system S. After that, when the user information recognition unit 10 has recognized the new user information, information obtained by making addition to or changing the initial information based on the new user information is to be stored.

Further, in the event there is no registration procedure for receiving the service or the like, when the user information recognition unit 10 has recognized user information for the first time, the user information may be stored as the initial information.

Further, when the selection status recognition unit 16 has recognized a selection status (described later), the user information storage unit 11 is configured to store the selection status therein, either with respect to each user U or with respect to each group having identical or corresponding user information to that of the user U. The corresponding user information denotes user information in which a part of the user information is either identical or similar.

The current emotion recognition unit 12 is configured to recognize a current emotion which is an emotion experienced at the time when the user U wishes to receive the service offered by the presentation system S (i.e., when the user U wishes to obtain the food information). The current emotion recognition unit 12 includes an emotion model exhibition unit 12a and a coordinate recognition unit 12b.

Via the user terminal 2, the emotion model exhibition unit 12a is configured to exhibit, for the user U, an emotion model being a planar model in which coordinates are defined based on a plurality of basic emotions, while using a format in which the user U is able to select one of the sets of coordinates from the emotion model.

In this situation, as the "basic emotions", for example, it is acceptable to adopt any of the following adopted by Plutchik's wheel of emotions such as joy, trust, fear, surprise, sadness, disgust, anger, and anticipation or any of the following discussed in Ekman's theory such as joy, fear, surprise, sadness, disgust, and anger.

Figure 3A:
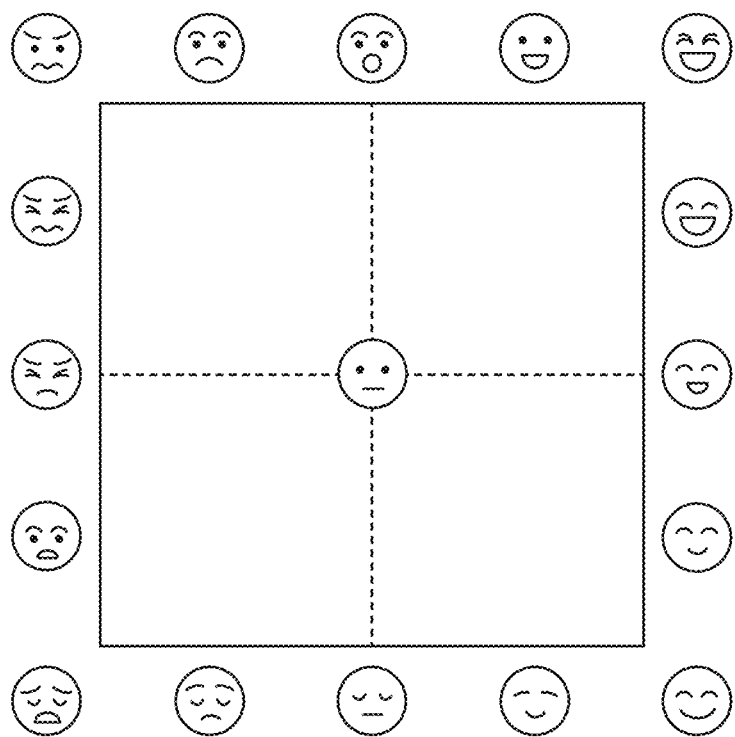
FIG. 3A is a schematic chart showing an example of an emotion model used by the presentation system in FIG. 1 for obtaining a current emotion.

Adopted as the emotion model in the presentation system S is a model including a first coordinates axis representing the plurality of basic emotions and a second coordinate axis representing magnitudes of the basic emotions. More specifically, adopted as the emotion model in the presentation system S is the EmojiGrid shown in FIG. 3A (see FIG. 6).

In the EmojiGrid, the first coordinate axis representing the basic emotions is defined by arranging face images expressing certain emotions in a periphery part at prescribed intervals. Further, in the EmojiGrid, a face image expressing a state where no specific emotion is experienced is placed at a center position serving as the origin, while the distances from the origin to the images expressing the certain emotions arranged in the periphery part are defined as the second coordinate axis representing the magnitudes of the emotions corresponding to the images.

In this situation, the emotion model of the present invention is not limited to the EmojiGrid described above. It is acceptable to use any planar model or three-dimensional model in which coordinates are defined based on a plurality of basic emotions.

Figure 3B:
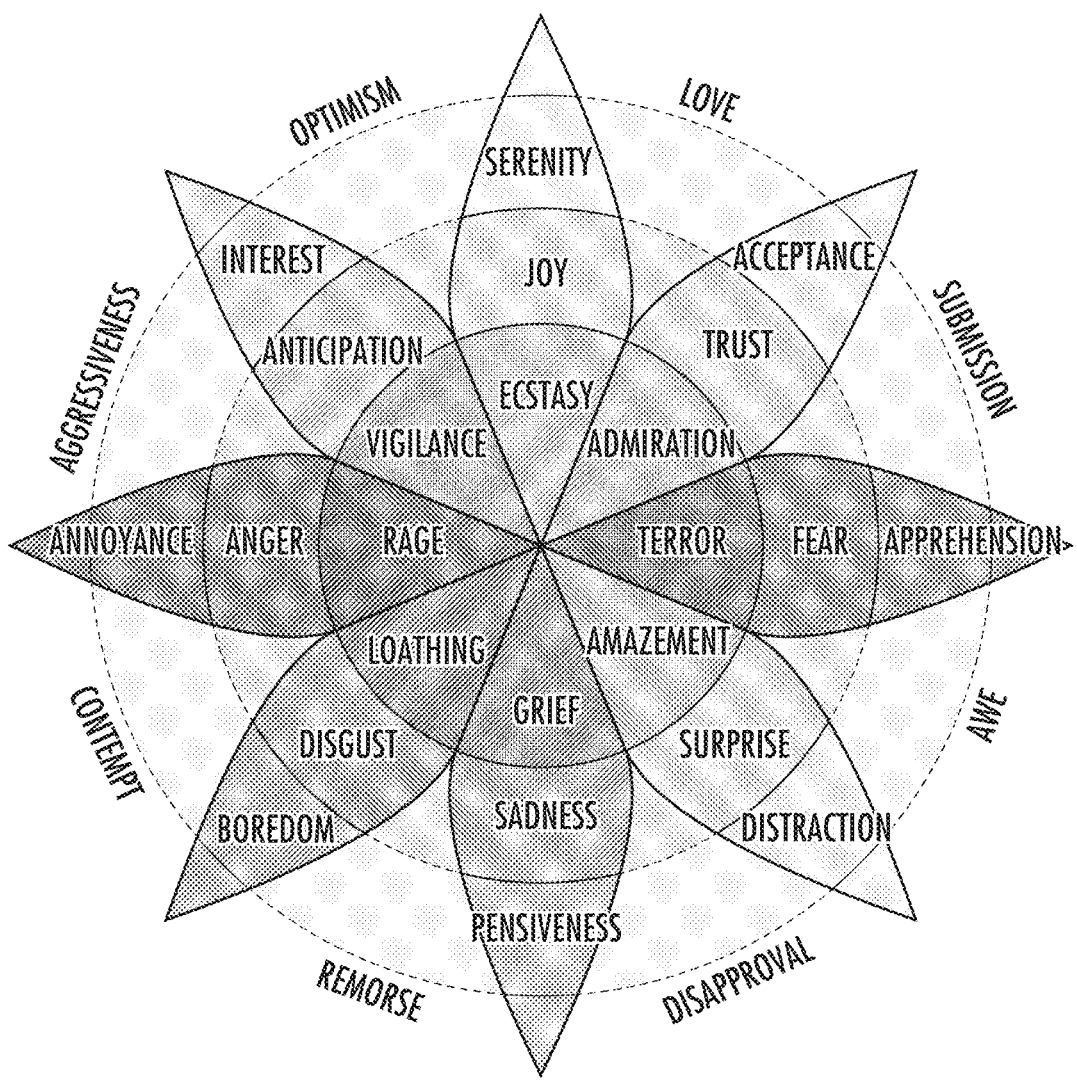
FIG. 3B is a schematic chart showing an example of an emotion model used by a presentation system according to a first modification example for obtaining a current emotion.

Accordingly, as shown in a first modification example in FIG. 3B, it is also acceptable, for instance, to adopt Plutchik's wheel of emotions as the emotion model. Further, it is also acceptable to adopt a model conveniently using the color arrangements in Plutchik's wheel of emotions, while the text is eliminated. Conversely, it is also acceptable to adopt a model conveniently using text arrangements in Plutchik's wheel of emotions, while the colors are eliminated.

Figure 3C:
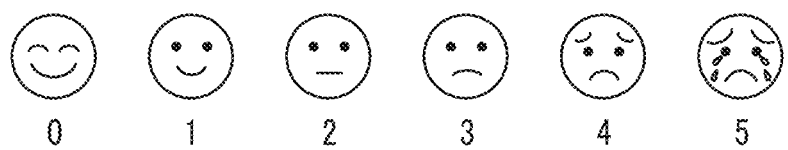
FIG. 3C is a schematic chart showing an example of an emotion model used by a presentation system according to a second modification example for obtaining a current emotion.

Further, as shown in a second modification example in FIG. 3C, it is also acceptable, for instance, to adopt a face scale as the emotion model. Also, although only the single type of face scale is used as the emotion model in the example in FIG. 3C, it is also acceptable to arrange a plurality of types of face scales side by side.

Further, although the examples using the planar models as the emotion models were described in the present embodiment, the first modification example, and the second modification example, possible emotion models of the present invention are not limited to the configurations described above. It is also acceptable to use a model obtained by making any of those models three-dimensional.

The coordinate recognition unit 12b is configured to recognize selected coordinates that are coordinates selected by the user U from the emotion model, via the input unit 20 of the user terminal 2. In the presentation system S, the coordinate recognition unit 12b is configured to recognize, as the selected coordinates, the coordinates designated as a result of the user U touching the emotion model displayed on the touch panel serving as the input unit 20 and the output unit 21 of the user terminal 2.

In the example using the face scale as shown in the second modification example in FIG. 3C, it is also acceptable to make only the face images (buttons) structuring the face scale selectable, so that the selected coordinates in the face scale are recognized as the selected coordinates. Further, it is also acceptable to make selectable any coordinates in a range in which the face scale is displayed.

Further, the coordinate recognition unit 12b is configured to recognize the recognized selected coordinates themselves as the current emotion. Accordingly, the coordinate recognition unit 12b does not particularly specify what emotion corresponds to the coordinates.

By using a prescribed prediction model, the recommended food recognition unit 13 is configured to recognize a plurality of recommended food items and recommendation degrees of the recommended food items.

The prediction model used by recommended food recognition unit 13 is a model that has learned, through machine learning, a correlation between candidate food items, and selected coordinates and user information, as well as the recommendation degree indicating a magnitude of the correlation, while using each of the plurality of candidate food items, and the selected coordinates recognized by the current emotion recognition unit 12, the user information recognized by the user information recognition unit 10, and the selection status (described later), as training data. When the user information recognized by the user information recognition unit 10 and the current emotion recognized by the current emotion recognition unit 12 are input to the prediction model, the recommended food items and the recommendation degrees of the recommended food items are output.

In this situation, the "candidate food items" are food items that are used by the prediction model and that may each serve as a recommended food item.

Further, in the present example, the "training data" is data used for training a machine learning algorithm and examples thereof include feature values and correct answer data used in the training, and sets made up of the feature values and the correct answer data. Further, more specifically, the "training data" is data used for determining parameters included in the machine learning algorithm and examples thereof include feature values and correct answer data used for determining the parameters, and sets made up of the feature values and the correct answer data.

Further, after the selection status recognition unit 16 has recognized the selection status (described later), the prediction model is caused to learn, through machine learning, a correlation between candidate food items, and selected coordinates and user information, as well as a recommendation degree indicating a magnitude of the correlation, either every time a selection status is recognized or when a selection status has been recognized a prescribed number of times, while using a selection status from the past, in addition to each of the plurality of candidate food items, and the selected coordinates and the user information, as training data.

As for the selection status from the past, it is not necessarily required to adopt all the selection statuses up to the present time. It is acceptable to adopt a selection status at prescribed timing (e.g., a prescribed number of times in the immediate past or within a prescribed time period).

The food information storage unit 14 has stored therein a plurality of pieces of information about the candidate food items. The type of the information corresponds to the food information described above. More specifically, the stored information includes, in addition to information about the food items themselves such as the names, ingredients, and recipes of the food items, information about businesses that offer the food items, and information about how to acquire the food items such as the names of the services capable of delivering the food items.

In the presentation system S, the food information storage unit 14 serving as the food information recognition unit is structured as a part of the presentation system S; however, the food information recognition unit of the present invention is not limited to this configuration. It is sufficient as long as a plurality of pieces of information about the candidate food items are recognized.

Accordingly, for example, the food information recognition unit in use may be provided in another independent system different from the food information presentation system. Further, as the food information recognition unit, it is also acceptable to use a processing unit configured to gather and recognize a plurality of pieces of food information by searching for information from the Internet, instead of a database storing the food information therein.

From the food information storage unit 14, the food information presentation unit 15 is configured to obtain, as the food information to be exhibited for the user U, the information about each of the plurality of recommended food items recognized by the recommended food recognition unit 13. Further, via the output unit 21 of the user terminal 2, the food information presentation unit 15 is configured to present the user U with the obtained food information corresponding to each of the plurality of food items, while using a selectable format.

In this situation, the food information presentation unit 15 is configured to recognize the recommendation degrees recognized by the recommended food recognition unit 13 with respect to the plurality of recommended food items, respectively and configured to further present the food information based on the recommendation degrees. More specifically, in the presentation system S, the higher the recommendation degree of a recommended food item is, the higher priority is given (e.g., being placed in the higher position) to the display of the food information on a display screen (see FIG. 7).

Further, in accordance with the user information of the user U recognized by the user information recognition unit 10 at this time, the food information presentation unit 15 may change a manner in which the food information is presented. For example, when the user information includes information indicating that the eating behavior at this time is related to cooking his/her own meal, the food information presentation unit 15 may present a recipe of the food, as the food information. In contrast, when information related to eating out is included, the food information presentation unit 15 may not present the recipe of the food, but may present a business that offers the food, as the food information.

When the user U has selected, via the input unit 20 of the user terminal 2, one of the plurality of pieces of food information presented by the food information presentation unit 15, the selection status recognition unit 16 is configured to recognize, to begin with, the recommended food item corresponding to the food information as a selected food item. Further, the selection status recognition unit 16 is configured to recognize a status at a point in time when the selected food item is recognized (i.e., at the point in time when one of the recommended food items becomes the selected food item), as the selection status.

In this situation, examples of the "selection status", as for a status on the system side, include: the number of times of selection indicating how many times each food item has become a selected food item; a display position; as well as a recommended food item which served as a selected food item before the current selected food item was selected; and the type of the recommended food item which was simultaneously exhibited at the point in time when the selected food item was selected.

Further, examples of the selection status, as for a status on the user side, include: the time at which the selected food item was selected (which therefore indicates whether the food is for breakfast or for dinner) and an action taken by the user (e.g., operations performed on a mobile terminal) before and after the point in time when the selected food item was selected. Further, examples of the operations performed on the mobile terminal include not only operations consciously performed on the terminal by the user (e.g., an operation performed on a touch panel), but also operations unconsciously performed by the user (e.g., browsing periods of the food information).

Further, either with respect to each user U or with respect to each group having identical or corresponding user information to that of the user U, the selection status recognition unit 16 is configured to store the recognized selection status into the user information storage unit 11, with regard to each of the plurality of recommended food items.

A Process Performed by the Processing Units

Next, a food information presentation method represented by a process performed by the presentation system S will be described, with reference to FIG. 2 and FIGS. 5 to 8.

Figure 4A:
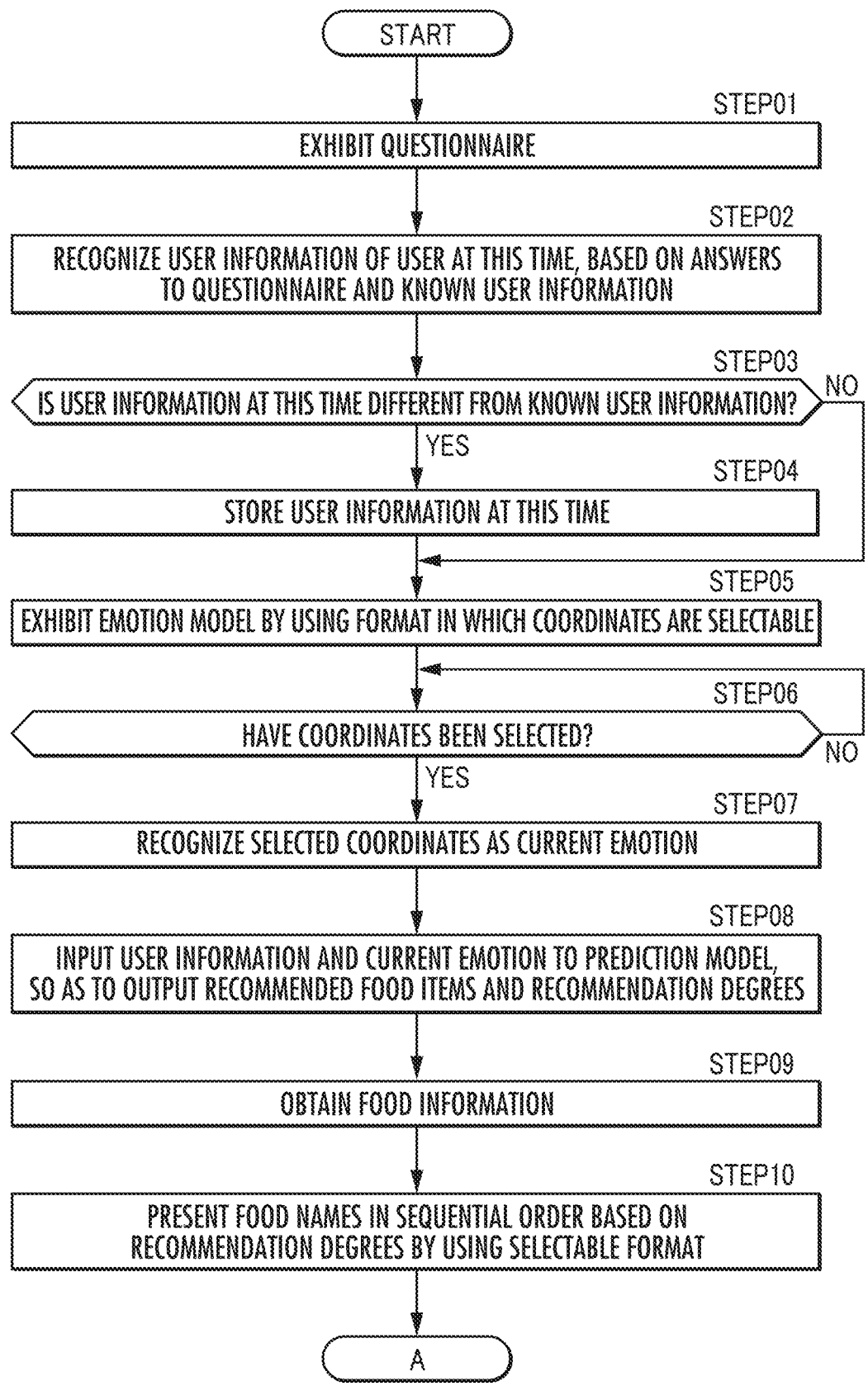
FIG. 4A is a flowchart showing a process performed by the presentation system in FIG. 1, up to the time of presenting food information.

In this process, to begin with, via the user terminal 2, the user information recognition unit 10 exhibits, for the user U, a questionnaire for checking current user information by using an answerable format (FIG. 4A; STEP 01).

More specifically, when the service offered by the presentation system S is used for the first time, to begin with, the questionnaire asking for information used for recognizing the user U (e.g., an account name registered separately) is exhibited in the answerable format.

When the questionnaire has been answered or when the service is to be used for the second time or later, a questionnaire asking about the age of the user U (biological information), how many people live with the user, whether the user cooks his/her own meal or eats out (an environment of the eating behavior), favorite ingredients (preferences), and the like is exhibited in an answerable format, as shown in FIG. 5.

After that, when the questionnaire is answered, the user information recognition unit 10 recognizes the user information of the user U at this time, based on the answers to the questionnaire and the known user information (FIG. 4A; STEP 02).

Subsequently, the user information recognition unit 10 determines whether the user information at this time is different from the known user information (FIG. 4A; STEP 03).

When the user information at this time is different from the known user information (STEP 03: YES), the user information recognition unit 10 updates the user information by storing the user information at this time into the user information storage unit 11 (FIG. 4A; STEP 04).

More specifically, when the service is to be used for the first time, the user information recognition unit 10 recognizes the user information of the user U at this time, based on the information acquired separately at the time of registering the account or the like and the answers to the questionnaire given at this time. In this situation, because the user information has not yet been stored, and the user information at this time is naturally different from the known user information, the user information recognition unit 10 stores the user information at this time, without applying any modification thereto, into the user information storage unit 11 as the user information of the user U.

In contrast, when the service is to be used for the second time or later, to begin with, the user information recognition unit 10 compares the user information of the user U recognized at this time, with the user information of the user U which is from the immediately preceding occasion or earlier and is obtained from the user information storage unit 11. Further, when the two pieces of user information are different from each other, the user information recognition unit 10 generates new user information in which the user information at this time is adopted regarding the different part and further stores the new user information into the user information storage unit 11 as the user information of the user U.

On the contrary, when the user information at this time is not different from the known user information (STEP 03: NO) or when the user information has newly been stored into the user information storage unit 11 (i.e., when STEP 04 has been executed), the current emotion recognition unit 12 exhibits, for the user U, the emotion model via the user terminal 2, by using a format in which coordinates are selectable from the emotion model (FIG. 4A; STEP 05).

Figure 6:
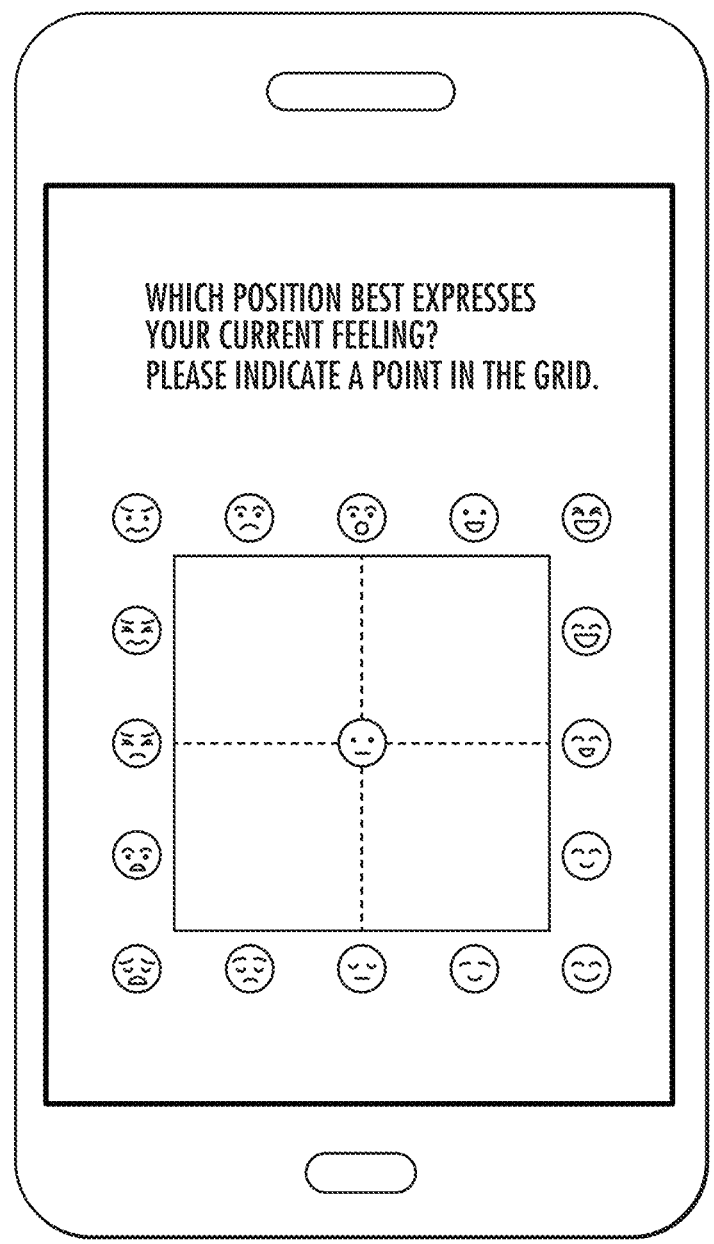
FIG. 6 is a conceptual drawing showing an example of an image displayed on a user terminal when the presentation system in FIG. 1 is to recognize a current emotion.

More specifically, as shown in FIG. 6, the current emotion recognition unit 12 displays the emotion model (the EmojiGrid) on the touch panel of the user terminal 2. After that, when the user touches a point in the emotion model, the current emotion recognition unit 12 determines that the coordinates of the point have been selected.

Subsequently, the current emotion recognition unit 12 determines whether a set of coordinates has been selected from the emotion model (FIG. 4A; STEP 06).

When none of the coordinates has been selected (STEP 06: NO), the current emotion recognition unit 12 repeatedly performs the determination process in STEP 06 in prescribed control cycles.

On the contrary, when a set of coordinates has been selected (STEP 06: YES), the current emotion recognition unit 12 recognizes the set of coordinates as the selected coordinates and recognizes the selected coordinates as a current emotion (FIG. 4A; STEP 07).

Subsequently, by inputting the user information at this time and the current emotion to the prediction model, the recommended food recognition unit 13 outputs a plurality of recommended food items for the user U and a recommendation degree of each of the plurality of recommended food items (FIG. 4A; STEP 08).

After that, with respect to each of the plurality of recommended food items, the food information presentation unit 15 obtains the food information from the food information storage unit 14 (FIG. 4A; STEP 09).

Subsequently, via the user terminal 2, the food information presentation unit 15 presents the user U with the food names being one of the pieces of obtained food information, according to a sequential order based on the recommendation degrees of the recommended food items corresponding to the food information, by using a selectable format (FIG. 4A; STEP 10).

Figure 7:
FIG. 7 is a conceptual drawing showing an example of an image displayed on a user terminal when the presentation system in FIG. 1 presents food information.

More specifically, as shown in FIG. 7, the food information presentation unit 15 presents the food information by displaying the food names arranged in an up-and-down direction, on the touch panel of the user terminal 2. In that situation, the sequential order of the food names is determined in such a manner that the higher the recommendation degree of the corresponding recommended food item is, the higher position the food name is placed in. After that, when the user touches one of the food names, the food information presentation unit 15 determines that the recommended food item corresponding to the food name has been selected.

After that, the food information presentation unit 15 determines whether one of the food names has been selected (FIG. 4B; STEP 11).

When none of the food names has been selected (STEP 11: NO), the food information presentation unit 15 repeatedly performs the determining process in STEP 11 in prescribed control cycles.

On the contrary, when one of the food names has been selected (STEP 11: YES), via the user terminal 2, the food information presentation unit 15 presents the user U with details of the food information about the recommended food item corresponding to the selected food name (FIG. 4B; STEP 12).

Figure 8:
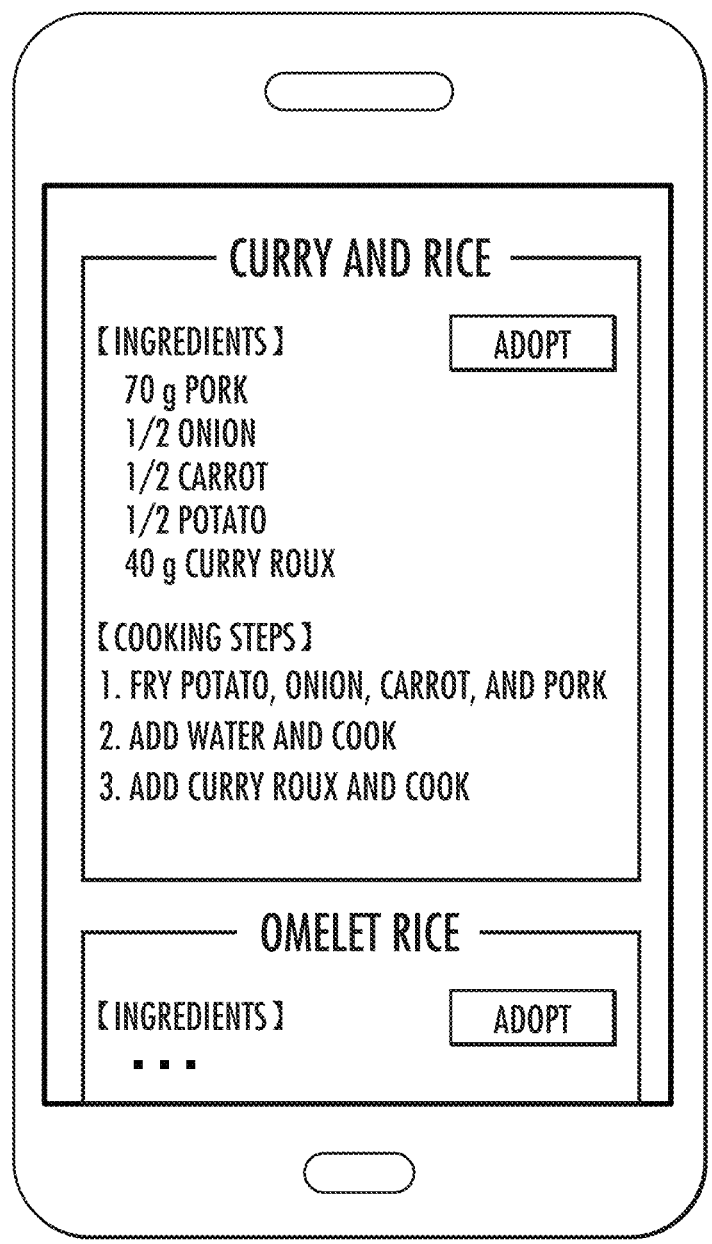
FIG. 8 is a conceptual drawing showing an example of an image displayed on a user terminal when one of the pieces of food information has been selected in the presentation system in FIG. 1.

More specifically, as shown in FIG. 8, when the user information at this time includes information indicating that the eating behavior is related to cooking his/her own meal, for example, the food information presentation unit 15 displays, on the touch panel of the user terminal 2, a recipe of the recommended food item corresponding to the selected food name. In contrast, when information related to eating out is included, the food information presentation unit 15 displays, on the touch panel, a business or a service which offers the recommended food item corresponding to the selected food name.

After that, the selection status recognition unit 16 determines whether or not the selected food information has been adopted (i.e., whether the food item has become a selected food item) (FIG. 4B; STEP 13).

More specifically, when the food information presentation unit 15 displays the recipe of the food item on the touch panel of the user terminal 2, the selection status recognition unit 16 displays an "ADOPT" button together with the recipe. Further, when the "ADOPT" button is selected, it is determined that the recommended food item corresponding to the recipe (i.e., the food information) is adopted together with the ADOPT button and has become a selected food item.

When the selected food information is not adopted (STEP 13: NO), the process returns to STEP 11 where the presentation system S performs again the process in steps 11 through 13.

On the contrary, when the selected food information is adopted (STEP 13: YES), the selection status recognition unit 16 recognizes the selection status (FIG. 4B; STEP 14).

More specifically, the selection status recognition unit 16 extracts and recognizes the selection status, based on information input to or output by the user terminal 2, information about the user U at this time among the pieces of user information stored in the user information storage unit 11, a time obtained from a clock which the presentation system S comprises, and/or the like.

For instance, examples of the selection status include: the number of times of selection indicating how many times each food item has become a selected food item; a display position; a recommended food item which served as a selected food item before the selected food item at this time was selected by the user U at this time; the type of the recommended food item which was simultaneously exhibited when the selected food item at this time was selected, the time at which the selection was made (which therefore indicates whether the food item is for breakfast or for dinner), and/or the like.

Subsequently, either with respect to each user U or with respect to each group having identical or corresponding user information to that of the user U, the selection status recognition unit 16 stores the selection status of the selected food item into the user information storage unit 11 (FIG. 4B; STEP 15).

After that, while the selection status recognized at this time is added, the recommended food recognition unit 13 causes the prediction model to learn, through machine learning, a correlation between the candidate food item, and the selected coordinates, the user information, and the selection status, as well as the recommendation degree indicating the magnitude of the correlation, while using the selection status from the past as training data in addition to the selected food item (i.e., the corresponding candidate food item), and the selected coordinates and the user information (FIG. 4B; STEP 16). The process at this time thus ends.

The recommended food recognition unit 13 does not necessarily need to carry out the machine learning to which the selection status is added, every time a selection status is recognized. The machine learning may be carried out when a prescribed number of selection statuses have been gathered.

As described above, in the food information presentation method implemented by the presentation system S, the emotion model being the planar model in which the coordinates are defined based on the plurality of basic emotions is adopted as the interface for inputting the emotion of the user S, so that the coordinates selected from the emotion model are recognized as the emotion of the user U. Consequently, without a conversion into a linguistic expression or the like, the user U is able to easily and accurately express his/her own emotion with a value represented by the coordinates.

Further, in the presentation system S, the coordinates are used as the input data. In other words, in the present system, instead of an ambiguous parameter called an emotion, the definitive parameter realized with the coordinates is adopted. Consequently, because ambiguity is eliminated from the input data in the present system, it is possible to obtain the accurate recommended food items as the output data.

Consequently, the presentation system S is able to present the user U with the food information about the suitable recommended food items, while the emotion is also accurately taken into account. In addition, by carrying out the eating behavior on the recommended food items, the user U is able to achieve satisfaction with a high probability.

A Modification Example of the Presentation System

In relation to the above, in the present embodiment, adopted as the emotion model is the model including the first coordinate axis representing one or more basic emotions and the second coordinate axis representing magnitudes of the basic emotions.

When the model using such coordinate axes is adopted as the emotion model, the user U is able to easily and intuitively understand which emotion is indicated by certain coordinates in the emotion model. As a result, the user U is able to easily and accurately express his/her emotion as the coordinates, and ambiguity is further eliminated from the input data. Consequently, it is possible to present the user U the food information about even more suitable recommended food items, while the emotion is taken into account further accurately.

However, possible examples of the emotion model of the present invention are not limited to the configuration described above. It is acceptable to use a planar model or a three-dimensional model in which coordinates are defined based on a plurality of basic emotions. For this reason, for example, the emotion model may be a model including no coordinate axis. More specifically, it is also acceptable to adopt, as an emotion model, a model in which a plurality of colors are simply arranged in prescribed positions.

Further, in the present embodiment, the recommended food recognition unit 13 is configured to recognize the plurality of pieces of food information, whereas the food information presentation unit 15 is configured to present the user U with the food information corresponding to each of the plurality of recommended food items.

In this manner, when the food information about the plurality of recommended food items is presented, a final selection as to on which recommended food item the eating behavior is to be carried out is entrusted to the user U. As a result, when the eating behavior is actually carried out on the selected recommended food item, the user U is able to feel a sense of being convinced that the food item on which the eating behavior is carried out has been selected by himself/herself. Thus, the user U is able to easily achieve satisfaction from a result of the eating behavior.

However, possible examples of the food information presentation system of the present invention are not limited to the configuration described above. The recommended food recognition unit may be configured to recognize a single recommended food item. Also, the food information presentation unit may be configured to present the food information about only one of the plurality of recommended food items.

Further, in the present embodiment, when the food information has been selected, the selection status recognition unit 16 is configured to recognize the selection status, so that the recommended food recognition unit 13 carries out the machine learning on the prediction model by using the selection status.

In this manner, regarding the selected food item obtained at the immediately preceding occasion or earlier, the prediction model configured to adopt, as the training data, the selection status indicating the status corresponding to the point in time when the food item became the selected food item reflects an actual state of the user U. As a result, by carrying out the eating behavior on the recommended food item output by the predication model, the user U is able to achieve satisfaction with an even higher probability.

However, possible examples of the prediction model of the present invention are not limited to the configuration described above. It is sufficient as long as a prediction model is configured to learn, through machine learning, a correlation between candidate food items, and selected coordinates and user information, while using each of the plurality of candidate food items, and the selected coordinates and the user information as the training data, so that the prediction model is configured to receive an input of the user information and a current emotion and to select and output a recommended food item from among the plurality of candidate food items.

Consequently, for example, instead of recognizing the selection status and carrying out the machine learning on the prediction model by using the selection status, it is also acceptable to keep using a prediction model introduced at the time of constructing the system, without applying any modification thereto and without causing any subsequent machine learning process to be performed.

Further, in the present embodiment, the number of times of selection is adopted as the selection status. The reason is that becoming a selected food item means having a high possibility of being directly liked by the user U. Thus, by adopting the number of times of selection as the selection status in this manner, the output recommended food item easily conforms to preferences of the user U. Another reason is that it is possible to present the user with the food information about the suitable recommended food items.

However, possible examples of the selection status of the present invention are not limited to the configuration described above. It is sufficient as long as the selection status indicates a status corresponding to a point in time when a recommended food item of which the food information was presented became the selected food item, as being selected by the user. For this reason, for example, the selection status does not necessarily need to include the number of times of selection.

Further, in the present embodiment, the prediction model used by the recommended food recognition unit 13 is configured to output the recommendation degree of each of the plurality of recommended food items together with the plurality of recommended food items, so that the food information presentation unit 15 changes the manner in which the food information is presented based on the recommendation degrees.

In this manner, when the food information corresponding to each of the plurality of recommended food items is presented to the user U, either together with the recommendation degrees or by using the format where the higher the recommendation degree of the recommended food item is, the higher priority is given thereto, the user U is able to easily select the food information about a recommended food item that has a high recommendation degree and has a high possibility of giving him/her satisfaction.

However, possible examples of the food information presentation unit of the present invention are not limited to the configuration described above. It is sufficient as long as the food information is presented to the user. Accordingly, for example, it is also acceptable to change the sequential order of displaying the food information by using other criteria besides the recommendation degrees (e.g., the Japanese alphabetical order, a sequential order based on total costs of the ingredients, etc.). Further, it is also acceptable to display the food information in such a manner that the higher the priority is, the larger the display size on a display screen is. Furthermore, it is also acceptable to display values themselves of the recommendation degrees, together with the food information.

OTHER EMBODIMENTS

The embodiments shown in the drawings have thus been described. However, the present invention is not limited to those embodiments.

For example, in the above embodiments, the recommended food recognition unit 13 is configured to recognize the recommended food items by using the prescribed prediction model. However, possible examples of the recommended food recognition unit of the present invention are not limited to this configuration. Thus, the recommended food items may be recognized, instead of by the prediction model, based on correlation data indicating a correlation between the user information and the current emotion, and each of the plurality of candidate food items that each may serve as a recommended food item.

Further, in the above embodiments, the example was described in which the presentation system S is a single computer system; however, the present invention additionally incudes a food information presentation program that causes any one or more computers to execute the aforementioned food information presentation method, as well as a storage medium that has recorded the program thereon, so that a computer used by the user or the like is able to read the program.

REFERENCE SIGNS LIST 1 server; 2 user terminal; 10 user information recognition unit; 11 user information storage unit; 12 current emotion recognition unit; 12a emotion model exhibition unit; 12b coordinate recognition unit; 13 recommended food recognition unit; 14 food information storage unit (food information recognition unit); 15 food information presentation unit; 16 selection status recognition unit; 20 input unit; 21 output unit; S presentation system (food information presentation system); and U user.

The invention claimed is:

1. A food information presentation system which presents a user with food information about a food item recommended to the user, comprising one or more processors and memory storing computer-executable instructions, the one or more processes execute the computer-executable instructions to cause the food information presentations system to function as:
   a user information recognition unit configured to present a user information input interface for receiving user information input from the user to recognize user information including at least one of biological information, a preference, and an environment of the eating behavior of the user;
   a current emotion recognition unit configured to present an emotion input interface for receiving emotion input from the user to recognize a current emotion experienced at a point in time when the user is obtaining the food information;
   a recommended food recognition unit configured to recognize the recommended food item by using a prediction model which receives an input of the user information and the current emotion and outputs the recommended food item; and
   a food information presentation unit configured to obtain the food information from a food information recognition unit which has recognized a plurality of pieces of information about candidate food items being food items that are used by the prediction model and that may each serve as the recommended food item and further configured to present the user with the obtained food information, wherein
   the emotion input interface includes an emotion model being either a planar model or a three-dimensional model in which coordinates are defined based on a plurality of basic emotions, in a format in which a set of coordinates is selectable from the emotion model;
   the emotion model is presented on the emotion input interface as a two-dimensional user interface element having a first coordinate axis representing one or more basic emotions and a second coordinate axis, intersecting with the first coordinate axis, representing magnitudes of the basic emotions;
   a coordinate recognition unit is configured to recognize selected coordinates that are coordinates selected by the user from the emotion model as the current emotion based on user manipulation of the user interface element of the emotion input interface; and
   the recommended food recognition unit is configured to use the prediction model that has been trained to recognize, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

2. The food information presentation system according to claim 1, wherein
   the recommended food recognition unit is configured to recognize a plurality of recommended food items, and
   the food information presentation unit is configured to present the user with the food information corresponding to each of the plurality of recommended food items.

3. The food information presentation system according to claim 2, comprising:
   a selection status recognition unit configured to recognize, with respect to each of the plurality of recommended food items, a selection status being a status at a point in time when the recommended food item became a selected food item selected by the user from among the plurality of recommended food items, wherein
   the recommended food recognition unit is configured to use the prediction model that has been trained to recognize, through machine learning, a correlation between the candidate food items, and the selected coordinates, the user information, and the selection status while using each of the plurality of candidate food items, and the selected coordinates, the user information, and the selection status as training data, the prediction model being configured to output the recommended food item selected from among the plurality of candidate food items.

4. The food information presentation system according to claim 3, wherein
   as the selection status, the selection status recognition unit is configured to recognize a number of times of selection indicating how many times each of the plurality of recommended food items became at least the selected food item.

5. The food information presentation system according to claim 3, wherein
   the recommended food recognition unit is configured to use the prediction model that has been trained to recognize, through machine learning, the correlation between the candidate food items, and the selected coordinates, the user information, and the selection status, as well as a recommendation degree indicating a magnitude of the correlation, while using each of the plurality of candidate food items, and the selected coordinates, the user information, and the selection status as training data, the prediction model being configured to output the recommended food item selected from among the plurality of candidate food items and the recommendation degree of the recommended food item, and
   the food information presentation unit is configured to present the user with the food information corresponding to each of the plurality of recommended food items, either together with the recommendation degrees or by using a format where the higher the recommendation degree of the recommended food item is, a higher priority is given to the food information corresponding to the recommended food item.

6. A food information presentation system which presents a user with food information being information about a recommended food item on which the user is recommended to carry out eating behavior, comprising:
  a user information recognition unit configured to present a user information input interface for receiving user information input from the user to recognize user information including at least one of biological information, a preference, and an environment of the eating behavior of the user;
  a current emotion recognition unit configured to present an emotion input interface for receiving emotion input from the user to recognize a current emotion experienced at a point in time when the user is obtaining the food information;
  a recommended food recognition unit configured to recognize the recommended food item based on correlation data indicating a correlation between the user information and the current emotion, and each of a plurality of candidate food items that may each serve as the recommended food item; and
  a food information presentation unit configured to obtain the food information from a food information recognition unit which has recognized a plurality of pieces of information about the candidate food items and further configured to present the user with the obtained food information, wherein
  the emotion input interface includes an emotion model being either a planar model or a three-dimensional model in which coordinates are defined based on a plurality of basic emotions, in a format in which a set of coordinates is selectable from the emotion model;
  the emotion model is presented on the emotion input interface as a two-dimensional user interface element having a first coordinate axis representing one or more basic emotions and a second coordinate axis, intersecting with the first coordinate axis, representing magnitudes of the basic emotions;
  a coordinate recognition unit is configured to recognize selected coordinates that are coordinates selected by the user from the emotion model as the current emotion based on user manipulation of the user interface element of the emotion input interface.

7. A food information presentation method for presenting a user with food information being information about a recommended food item on which the user is recommended to carry out eating behavior, comprising:
  a step in which a user information recognition unit configured to present a user information input interface for receiving user information input from the user recognizes user information including at least one of biological information, a preference, and an environment of the eating behavior of the user;
  a step in which a current emotion recognition unit configured to present an emotion input interface for receiving emotion input from the user recognizes a current emotion at a point in time when the user is obtaining the food information;
  a step in which a recommended food recognition unit recognizes the recommended food item by using a prediction model which receives an input of the user information and the current emotion and outputs the recommended food item; and
  a step in which a food information presentation unit obtains the food information from a food information recognition unit which has recognized a plurality of pieces of information about candidate food items being food items that are used by the prediction model and that may each serve as the recommended food item and further presents the user with the obtained food information, wherein
  the emotion input interface includes an emotion model being either a planar model or a three-dimensional model in which coordinates are defined based on a plurality of basic emotions, in a format in which a set of coordinates is selectable from the emotion model;
  the emotion model is presented on the emotion input interface as a two-dimensional user interface element having a first coordinate axis representing one or more basic emotions and a second coordinate axis, intersecting with the first coordinate axis, representing magnitudes of the basic emotions;
  a process performed by a coordinate recognition unit of the current emotion recognition unit recognizes selected coordinates that are coordinates selected by the user from the emotion model as the current emotion based on user manipulation of the user interface element of the emotion input interface, and
  in the step of recognizing the recommended food item, the recommended food recognition unit is configured to use the prediction model that has been trained to recognize, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

8. A food information presentation device which presents a user with food information being information about a recommended food item on which the user is recommended to carry out eating behavior, comprising:
  a user information recognition unit configured to present a user information input interface for receiving user information input from the user to recognize user information including at least one of biological information, a preference, and an environment of the eating behavior of the user;
  a current emotion recognition unit configured to present an emotion input interface for receiving emotion input from the user to recognize a current emotion experienced at a point in time when the user is obtaining the food information;
  a recommended food recognition unit configured to recognize the recommended food item by using a prediction model which receives an input of the user information and the current emotion and outputs the recommended food item; and
  a food information presentation unit configured to obtain the food information from a food information recognition unit which has recognized a plurality of pieces of information about candidate food items being food items that are used by the prediction model and that may each serve as the recommended food item and further configured to present the user with the obtained food information, wherein
  the emotion input interface includes an emotion model being either a planar model or a three-dimensional model in which coordinates are defined based on a plurality of basic emotions, in a format in which a set of coordinates is selectable from the emotion model;
  the emotion model is presented on the emotion input interface as a two-dimensional user interface element having a first coordinate axis representing one or more basic emotions and a second coordinate axis, intersecting with the first coordinate axis, representing magnitudes of the basic emotions;

a coordinate recognition unit is configured to recognize selected coordinates that are coordinates selected by the user from the emotion model as the current emotion based on user manipulation of the user interface element of the emotion input interface; and the recommended food recognition unit is configured to use the prediction model that has been trained to recognize, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

9. A non-transitory storage medium that has recorded thereon a food information presentation program that causes a computer to execute a food information presentation method for presenting a user with food information being information about a recommended food item on which the user is recommended to carry out eating behavior, wherein the computer is caused to execute:

a step in which a user information recognition unit configured to present a user information input interface for receiving user information input from the user recognizes user information including at least one of biological information, a preference, and an environment of the eating behavior of the user;

a step in which a current emotion recognition unit configured to present an emotion input interface for receiving emotion input from the user recognizes a current emotion at a point in time when the user is obtaining the food information;

a step in which a recommended food recognition unit recognizes the recommended food item by using a prediction model which receives an input of the user information and the current emotion and outputs the recommended food item; and a step in which a food information presentation unit obtains the food information from a food information recognition unit which has recognized a plurality of pieces of information about candidate food items being food items that are used by the prediction model and that may each serve as the recommended food item and further presents the user with the obtained food information, the emotion input interface includes an emotion model being either a planar model or a three-dimensional model in which coordinates are defined based on a plurality of basic emotions, in a format in which a set of coordinates is selectable from the emotion model;

the emotion model is presented on the emotion input interface as a two-dimensional user interface element having a first coordinate axis representing one or more basic emotions and a second coordinate axis, intersecting with the first coordinate axis, representing magnitudes of the basic emotions;

a process performed by a coordinate recognition unit of the current emotion recognition unit recognizes selected coordinates that are coordinates selected by the user from the emotion model as the current emotion based on user manipulation of the user interface element of the emotion input interface, and in the step of recognizing the recommended food item, the recommended food recognition unit is configured to use the prediction model that has been trained to recognize, through machine learning, a correlation between the candidate food items, and the selected coordinates and the user information while using each of the plurality of candidate food items, and the selected coordinates and the user information as training data, the prediction model being configured to select and output the recommended food item from among the plurality of candidate food items.

* * * * *